US009267791B2

(12) United States Patent
McIlhany

(10) Patent No.: US 9,267,791 B2
(45) Date of Patent: Feb. 23, 2016

(54) SASH POSITION SENSOR

(71) Applicant: Siemens Industry, Inc., Alpharetta, GA (US)

(72) Inventor: Keith McIlhany, Antioch, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 597 days.

(21) Appl. No.: 13/631,239

(22) Filed: Sep. 28, 2012

(65) Prior Publication Data

US 2014/0094106 A1     Apr. 3, 2014

(51) Int. Cl.
*F24F 11/00*     (2006.01)
*G01B 11/28*     (2006.01)
*B08B 15/02*     (2006.01)
*G06T 7/00*     (2006.01)

(52) U.S. Cl.
CPC ............ *G01B 11/285* (2013.01); *B08B 15/023* (2013.01); *F24F 11/001* (2013.01); *F24F 11/0001* (2013.01); *G06T 7/0042* (2013.01); *G06T 2207/30108* (2013.01); *G06T 2207/30204* (2013.01)

(58) Field of Classification Search
CPC .. B08B 15/023; F24F 11/0001; F24F 11/001; G01B 11/285; G06T 2207/30108; G06T 2207/30204; G06T 7/0042
USPC ........ 342/146, 147; 356/152.2, 5.01, 51, 628; 49/25, 26, 28
See application file for complete search history.

(56) References Cited

U.S. PATENT DOCUMENTS

2005/0048900 A1     3/2005   Scholten
2006/0079164 A1     4/2006   DeCastro et al.

FOREIGN PATENT DOCUMENTS

EP     0541864 A1    5/1993
WO    00/33983 A1    6/2000

OTHER PUBLICATIONS

"Sash Sensors", Mar. 8, 2004, XP055094008, Retrieved from the internet: URL:http://www.belnor.ca/pdf/SashSensors.pdf, 4 pages.
PCT Search Report for Application No. PCT/US2013/060279, dated Jan. 14, 2014, 12 pages.

*Primary Examiner* — Steven B McAllister
*Assistant Examiner* — Reginald McNeill, II

(57) ABSTRACT

Systems and methods for determining the area of a sash opening in a fume hood formed by at least one movable sash panel. An emitter and sensor panel is mounted in a fume hood enclosure space. The emitter and sensor panel comprises at least one light emitter mounted on one side of an optical sensor. The at least one light emitter is configured to illuminate the fume hood enclosure space. At least one reflective marker is mounted on one edge of the sash opening to reflect light from the at least one light emitter. Optical information detected at the optical sensor is used to determine a variable distance to the at least one reflective marker. The variable distance and known distance parameters are used to determine the area of the sash opening.

21 Claims, 10 Drawing Sheets

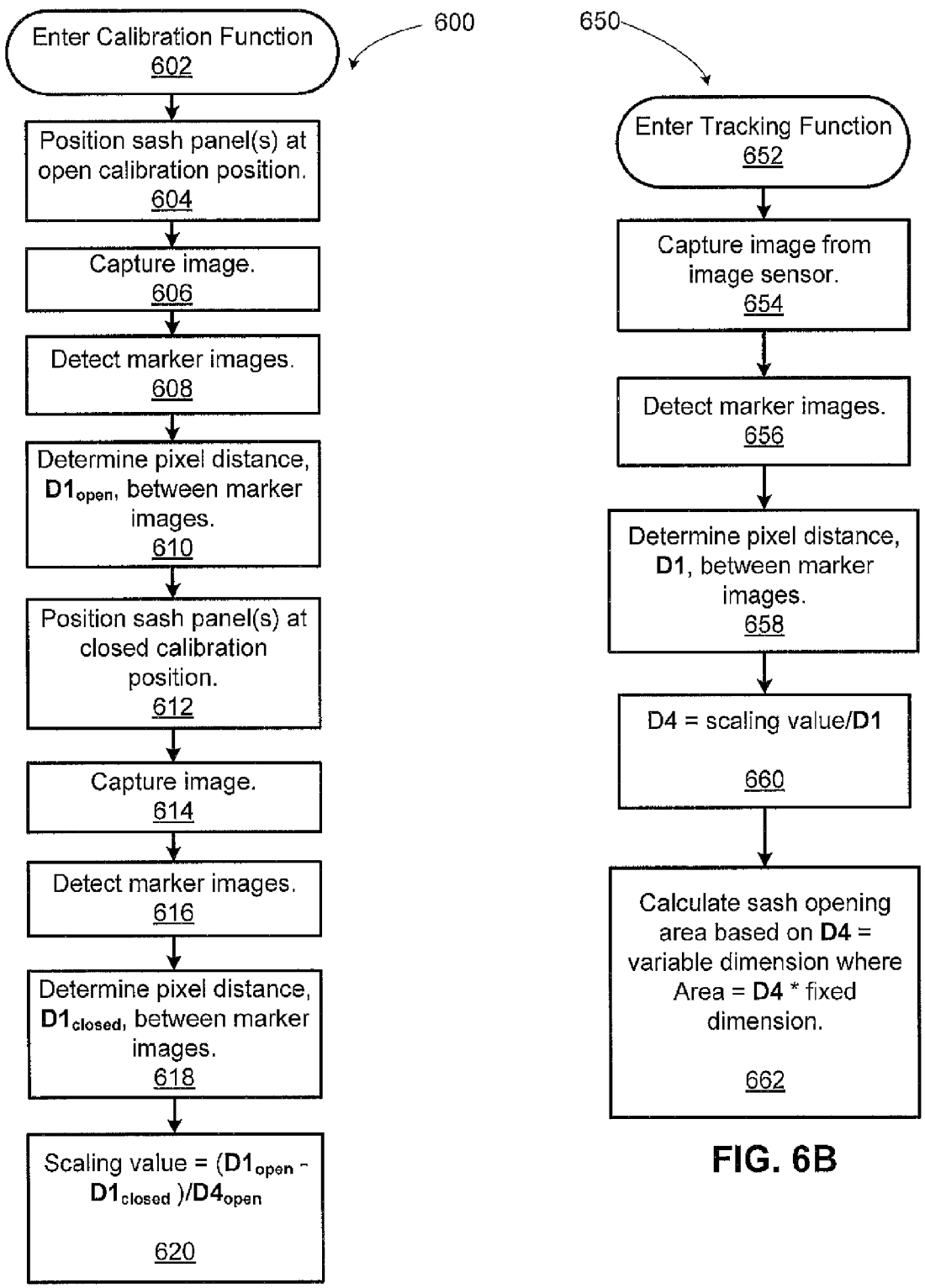

SASH POSITION SENSOR

CROSS-REFERENCE TO RELATED APPLICATION

Reference is made to U.S. patent application Ser. No. 13/631,355, titled "Sash Position Sensor Using Image Analysis," by inventor Paul Pelczynski, which is being filed on the same day as this application. The contents of the related application are incorporated by reference herein.

TECHNICAL FIELD

The present invention relates generally to fume hoods, and more particularly, to systems and methods for determining the position of a fume hood sash.

BACKGROUND

A fume hood is a ventilated structure that provides a controlled space in which a lab worker (where "lab worker" refers to a lab worker, lab technician, or any person working in a laboratory whether in a chemical company laboratory, a university, hospital, or other institution) performs experiments with potentially toxic chemicals. The controlled space is partially enclosed in the fume hood structure, which limits exposure to chemicals, as well as other noxious fumes, vapors, or dust as the lab worker works while positioned outside of the fume hood. The lab worker is provided access to the controlled space through a sash opening. The sash opening can be adjusted by moving sash panels (also referred to as fume hood doors, sash doors, sashes) that adjustably cover an opening in the fume hood. An exhaust fan, draws air from the room through the sash opening into the work area in the controlled space. The air is then vented outside of the building by the exhaust fan thereby removing the fumes, vapors or dust. The amount of air required to contain the chemicals is related to the open area of the sashes that are between the user and the chemicals. The greater the open area, the more air flow that is required to contain the chemicals.

The area of the sash opening in fume hoods may be controlled by the user. Fume Hood Controllers are being provided to measure the position of each sash panel, and to use the sash positions to determine the total open area of the fume hood. The Fume Hood Controller then uses the total open area, the measured exhaust flow, and the user-defined face velocity set point to maintain the required volume of airflow through the fume hood. The required volume of airflow is the volume of airflow that is sufficient to maintain the chemicals in the fume hood.

Fume hood controllers typically include a suitable processor and supporting memory, and permits entry and storage of the dimensions of the sash panels and other structural features. A sensor or multiple sensors are provided at strategic locations in the fume hood to determine the position of each sash. The open area of the fume hood is determined using the position of the sashes and the dimensions of the structure according to the geometry of the sash opening and fume hood.

The sensors used to detect the positions of the sashes typically require attachment or mounting by rather complex structure that is typically difficult to install. One example sensor structure uses conductive strips layered opposite a resistive strip and adhesively mounted on an edge of a sash. An actuator block is movably mounted in a track on a base member mounted to the fume hood and extending along a length in parallel with, and in suitably close proximity to, the edge of the sash. The actuator block is linked to a mounting block affixed to the sash such that when the sash panel moves, the linkage moves the actuator block in the track of the base member. As the actuator block moves within the base member, a steel ball that is spring loaded in the actuator block presses the conductive strips together. The conductive strips are energized in a voltage divider circuit and when the steel ball presses on the conductive strips, a short circuit is created and the position of the steel ball may be determined by taking voltage measurements.

Another way of sensing the position of fume hood sashes involves positioning a string of light emitters and corresponding detectors on a surface of the fume hood in proximity to one side of a sash. The light emitter and detector pairs are mounted along the length of one side of the sash and the detector is connected in parallel with a resistor. The string of light emitters and corresponding detectors is energized and the signal value at the end of the series connection of emitters is monitored. When the sash is present at a given light emitter, the light from the emitter is reflected off the side of the sash and the reflected light is detected by its corresponding light detector. When the detector senses the light reflected off the sash surface, the resistor in parallel with it is bypassed causing a corresponding change in the signal value across the series connection of the detectors. The signal value changes as the sash moves and provides an indication of the position of the sash.

Another way of sensing the position of the fume hood sashes involves mounting a string potentiometer to the fume hood. An end of the string potentiometer is fixed to the sash so that the sash pulls the string and changes the resistance on the potentiometer. A voltage measurement determines the extent to which the sash has pulled the string and when properly calibrated, provides the position of the sash.

The apparatuses and methods currently used for determining the position of the sash on a fume hood suffer from requiring mounting structure for sensing mechanisms that is difficult to install. The apparatuses and methods are also difficult to calibrate. The difficulty in installing and calibrating the sensing mechanisms affect the reliability, cost and robustness of the position sensing apparatuses.

In view of the foregoing, there is an ongoing need for systems, apparatuses and methods for determining the position of sashes on fume hoods that involve structure that is easy to install and calibrate.

SUMMARY

In view of the above, a system is provided for determining the area of a sash opening in a fume hood formed by at least one movable sash panel. Fume hoods have sash panels mounted over a hood opening to an enclosure structure of the fume hood. The sash panels are moved to open or close the fume hood at the sash opening. Opening the sash panel provides access to a work surface in the fume hood enclosure space. In an example system, an emitter and sensor panel is mounted in a fume hood enclosure space. The emitter and sensor panel comprises a first light emitter mounted on one side of an image sensor, and a second light emitter mounted on an opposite side of the image sensor. The first and second light emitters are configured to illuminate the fume hood enclosure space. A first reflective marker is mounted on one edge of the sash opening to reflect light from at least the first light emitter. A second reflective marker is mounted on an opposite edge of the sash opening to reflect light from at least the second light emitter. At least one of the edges of the sash opening with either the first or second reflective marker is formed by an edge of one of the movable sash panels.

A sash position tracking unit determines a distance between the first and second reflective markers based on a distance between a first marker image of the first reflective marker and a second marker image of the second reflective marker in an image detected by the image sensor. The distance between the first and second reflective markers is used to determine the area of the sash opening.

In another aspect, a method is provided for determining an area of a sash opening in a fume hood. According to an example method, an emitter and sensor panel is provided in the fume hood enclosure structure. The emitter and sensor panel comprises a first light emitter mounted on one side of an image sensor, and a second light emitter mounted on an opposite side of the image sensor. The fume hood enclosure space is illuminated using the first and second light emitters. A first marker image of light is detected as light reflecting off a first reflective marker attached to a first edge of, the sash opening. A second marker image of light is detected as light reflecting off a second reflective marker attached to a second edge of the sash opening opposite the first along a variable dimension of the sash opening area. A distance between the first and second reflective markers is determined, the distance being based on a distance between the first and second marker images. The distance between the first and second reflective markers is used to determine the sash opening area.

In another aspect, a system is provided for determining the area of a sash opening in a fume hood. According to an example system, an emitter and sensor panel is mounted in a fume hood enclosure space. The emitter and sensor panel comprises a light emitter mounted on one side of an optosensor at an emitter-optosensor distance between the light emitter and the optosensor. The light emitter is configured to illuminate the fume hood enclosure space. A reflective marker is mounted on one edge of the sash panel that is also an edge of the sash opening to reflect light from the light emitter. The optosensor is configured to generate a signal value indicative of a marker distance between the optosensor and the reflective marker. A sash position tracking unit is configured to determine a distance between the reflective marker and an opposite edge of the sash opening opposite the reflective marker. The distance between the reflective marker and the opposite edge is determined using the marker distance and the emitter-optosensor distance between the light emitter and optosensor. The distance between the reflective marker and the opposite edge of the sash opening is used to determine the area of the sash opening.

In an example system that uses the marker distance, the distance between the reflective marker and the opposite edge is determined as a first side of a right triangle having the emitter-optosensor distance as a second side, and the marker distance as a hypotenuse.

In another example system that uses the marker distance, a second reflective marker is mounted on the opposite edge of the sash opening. The emitter and sensor panel further comprises a second optosensor mounted on a side of the first optosensor opposite the first light emitter at an optosensor distance from the first optosensor. A second light emitter is mounted on a side of the second optosensor opposite the first optosensor at a second emitter-optosensor distance between the second optosensor and the second light emitter. The second optosensor is configured to generate another signal value indicative of another marker distance between the second optosensor and the second reflective marker. The sash position tracking unit is configured to determine the distance between the first reflective marker and the opposite edge using the other marker distance between the second optosensor and the second reflective marker and the second emitter-optosensor distance.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 6A is a flowchart illustrating operation of a calibration function for calibrating a system for measuring the area of a sash opening using an example implementation of an emitter and sensor panel.

FIG. 6B is a flowchart illustrating operation of a tracking function for measuring the area of a sash opening using an example implementation of a door emitter and sensor panel.

DETAILED DESCRIPTION

As used herein, the term "sash" refers to a movable panel or door positioned to cover a fume hood opening where movement of the sash varies the area of the fume hood opening.

As used herein, the term "sash opening" refers to the fume hood opening defined by the position of the sash panel where the maximum area of the fume hood opening is defined by the area of the fume hood opening with the sash panels positioned at a maximum open position.

I. Fume Hoods and Fume Hood Sashes

Figure 1A:
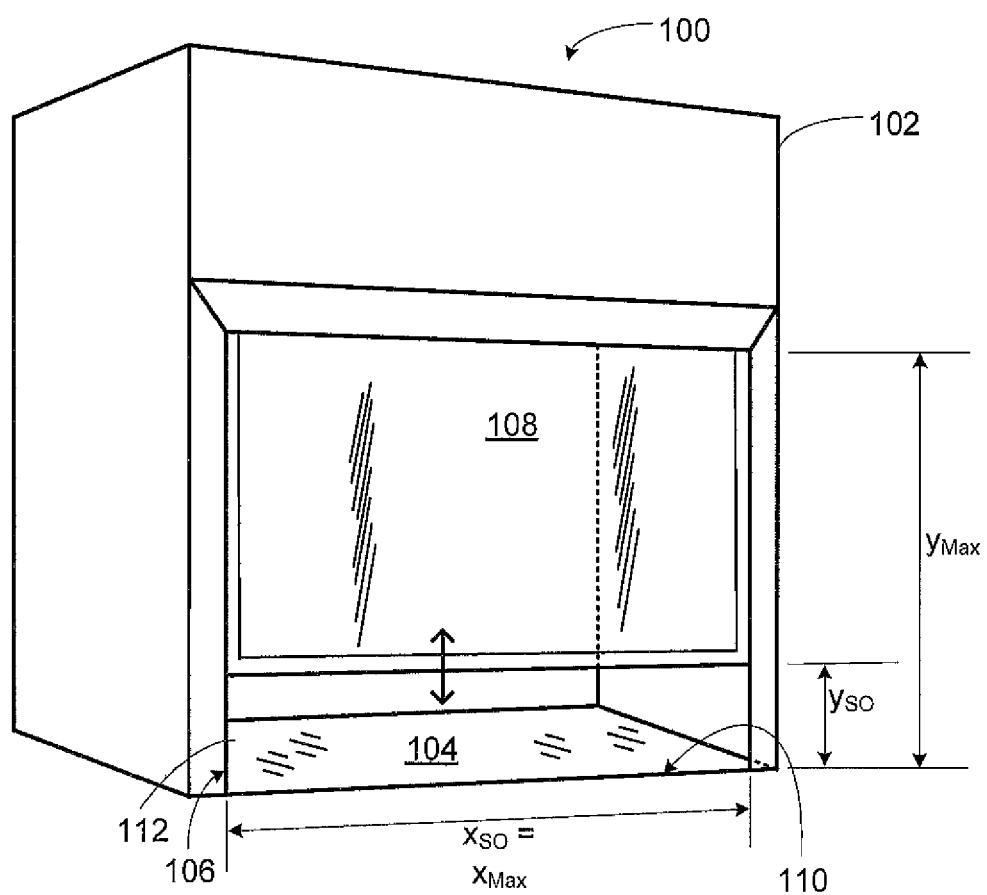
FIGS. 1A-1B are perspective illustrations of examples of fume hoods in which example implementations of systems and methods for determining a sash-opening area may be implemented.
Figure 1B:
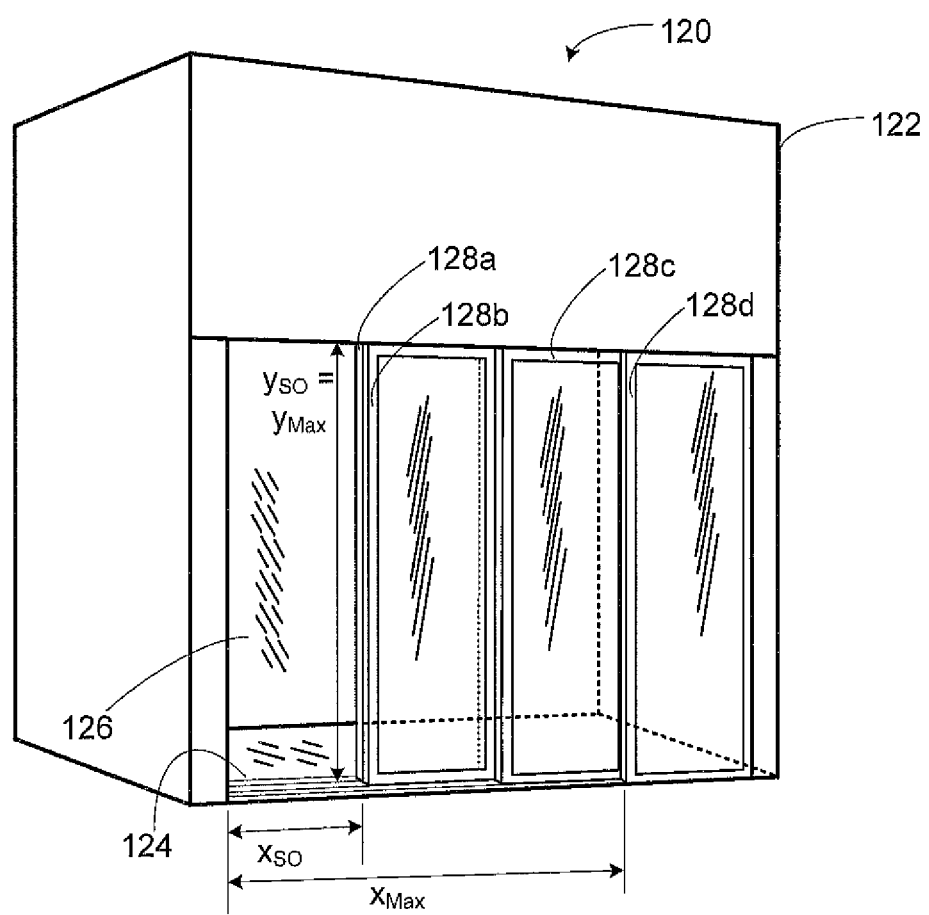

FIGS. 1A-1B are perspective illustrations of examples of fume hoods in which example implementations of systems and methods for determining a sash-opening area may be implemented. FIG. 1A shows a first fume hood 100 comprising an enclosure structure 102, a work surface 104, and a vertically movable sash panel 108. The enclosure structure 102 encloses the area of the work surface 104 on which work involving toxic or noxious fumes, vapors, and/or dust may be performed. A hood opening 106 provides access to the work surface 104. The hood opening 106 may be defined by a cutout in a front side or other side of the enclosure structure 102 having a vertical or longitudinal dimension of "$y_{Max}$" and a horizontal or latitudinal dimension of "$x_{Max}$" as shown in FIG. 1A. The vertically movable sash panel 108 is used to open or close the hood opening 106. In the example implementation shown in FIG. 1A, the sash panel 108 moves in a vertical direction such that the sash panel 108 is spaced above an edge 110 of the work surface 104 to form a sash opening 112 (as portion of hood opening 106) having a sash height H=$y_{sash}$, which has a value within the range of 0 to $y_{Max}$ for providing access to the work surface 104.

The fume hood 100 is connected to an exhaust fan and damper arrangement by ductwork (not shown in the Figures). The exhaust fan serves to draw air from the room through the sash opening 112, the interior of the enclosure structure 102, the ductwork and the damper. The air is then vented outside of the building by the exhaust fan thereby removing fumes, vapors or dust. A fume hood controller (not shown in FIGS. 1A-1B) may be included in or near the firm hood 100 to maintain the speed of the air (referred to herein as the face velocity) drawn through the fume hood 100 within a desired air speed range. If the face velocity is too low, there may be insufficient venting of the work surface 104. If the face velocity is too high, undesirable air turbulence is generated, which may cause movement of the contaminants into a worker's breathing zone. An acceptable range for the face velocity may vary between approximately 80-120 feet per minute (fpm) depending on the type of hood and hazard.

The fume hood controller may be configured to control the exhaust fan or fans, and dampers to keep the face velocity in the proper range. Typically, the ventilation system for the fume hood may be integrated with the ventilation system of the building in which the fume hood is installed. In such implementations, the fume hood controller may control air valves or dampers to adjust the face velocity. The face velocity is affected by the area or size of the sash opening 112 and any pressure drop that may exist across the sash panel 108. In order to maintain the face velocity within, the desired range given that the sash panel 108 is movable, an air valve may be adjusted to take into account the current size of the sash opening 112. For example, an air valve may be controlled to increase air Dow as the size of the sash opening 112 is increased. Conversely, the air valve is controlled to decrease the air flow as the size of the sash opening 112 is decreased. Similarly, the air valve may be adjusted to take into account the size of the sash opening 112 for the configuration shown in FIG. 1A.

The fume hood 120 shown in FIG. 1B includes an enclosure structure 122 similar to that of the fume hood 100 in FIG. 1A, and sash panels 128a, 128b, 128e, 128d that move horizontally to provide a sash opening 126 to access a work surface 124. The first sash panel 128a is shown moved over to a position in which it is directly behind the second sash panel 128b. The sash opening 126 shown in FIG. 1B has a width $x_{sash}$ from 0 to $x_{Max}$. The sash opening 126 has a fixed height of $y_{Max}$.

The sash opening 126 may be located at different positions along the width of a hood opening, which is the total opening in the fume hood 120 when the sash panels 128a, 128b, 128c, 128b are removed. As noted above, the sash opening 126 is formed by positioning the first sash panel 128a to a position behind the second sash panel 128b. The sash opening 126 may also be formed by moving the first and second sash panels 128a&b over to the left-most side leaving the sash opening 126 to extend to the right to the third sash panel 128c.

The sash opening 126 may also be formed by moving the second sash panel 128b to the left and the third sash panel 128c to the right. The maximum width $x_{Max}$ in the fume hood 120 in FIG. 1B is the width of the hood opening (without sash panels) minus the width of one of the sash panels). In another implementation, the sash panels 128 et seq. may be moved to a position beyond the outermost edges of the hood opening (without sash panels).

The sash opening area may be determined for the sash openings in the fume hoods shown in FIGS. 1A and 1B by determining an area of a rectangle formed by the edges around the sash opening shown in each drawing. The rectangle of the sash opening in each fume hood 100, 120 has an area $A(x,y) = x_{sass} \cdot y_{sash}$. Example implementations of systems and methods for determining the area of a sash opening using an emitter and sensor panel are described below. It is noted that the examples described below are for a fume hood similar to the fume hood 120 in FIG. 1B in which horizontally movable sashes 128 et seq. are used to provide the sash opening 126. Those of ordinary skill in the art will understand that the examples described herein may be similarly implemented in fume hoods having openings regardless of how they are formed.

II. Sash Opening Area Detection Methods Using Imaging

Figure 2A:
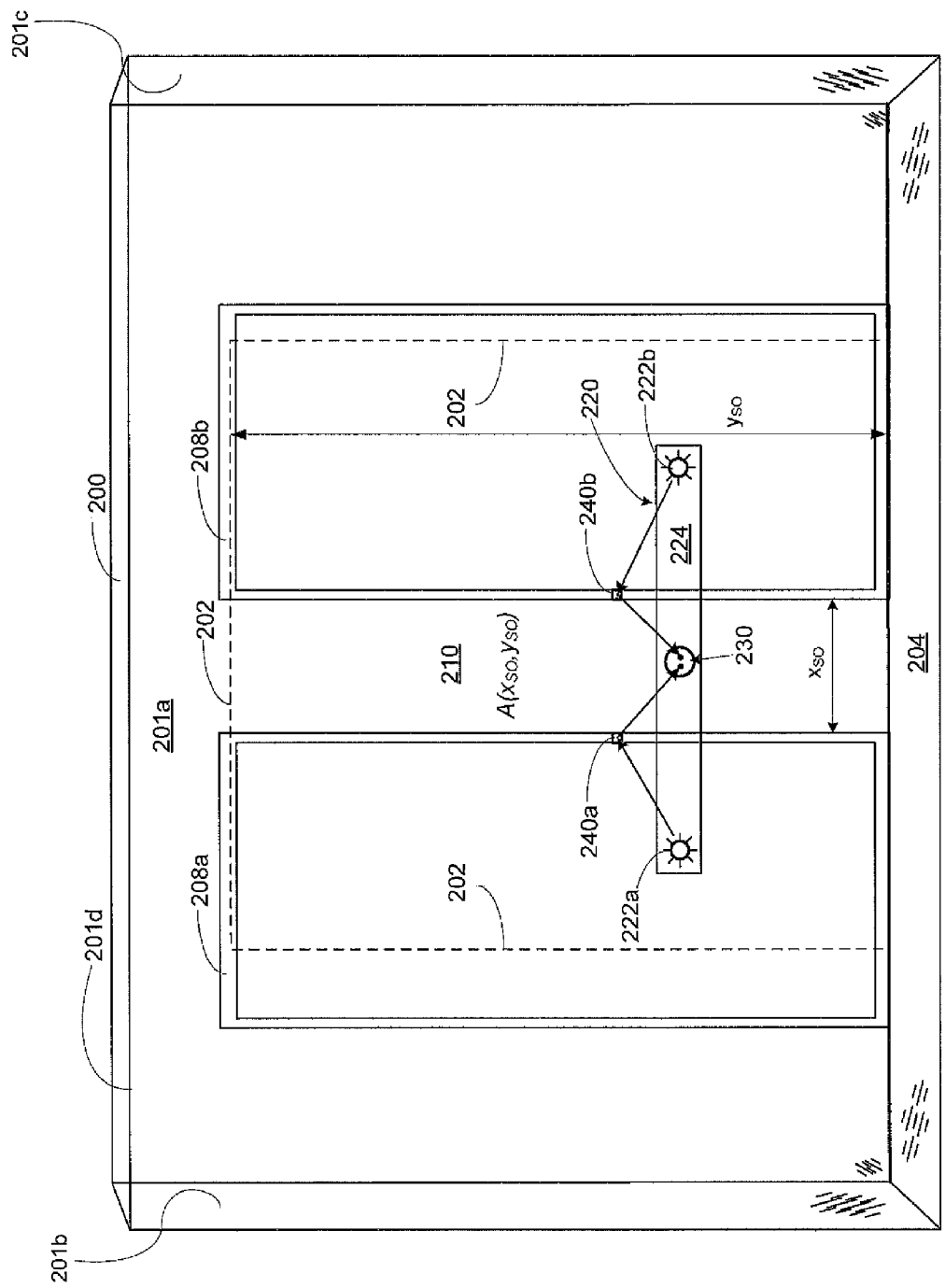
FIG. 2A is a transparent rear perspective view of an example of a fume hood 200 having two horizontally movable sash panels.

FIG. 2A is a transparent rear perspective view of an example of a fume hood 200 having two horizontally movable sash panels 208a, 208b. The sash panels 208a, 208b in FIG. 2A are movable horizontally to cover or create a sash opening 210 in a hood opening 202 (illustrated by a dashed line), which is an opening in the fume hood 200 without the sash panels 208a, 208b. The fume hood 200 includes an enclosure formed by a front inner wall 201a, side inner walls 201c & 201d, and rear inner wall 201d. The inner walls 201a, 201b, 201c, and 201d are formed around a work surface 204 to which access is provided by the sash opening 210.

An emitter and sensor panel 220 is mounted on the rear inner wall 201d of the fume hood 200. The emitter and sensor panel 220 comprises a first and second emitter 222a & 222b mounted on opposite sides of a support structure 224, and an image sensor 230 positioned at least approximately midway between the first and second emitters 222a & 222b on the emitter and sensor panel 220. The support structure 224 is shown as extending lengthwise to form bar-like structure for supporting the image sensor 230 and emitters 222. The support structure 224 may be implemented using any suitable structure capable of supporting the image sensor 230 and emitters 222 in an orientation relative to one another that enables the image sensor 230 to detect reflections of light emitted from, the emitters 222a & 222b. The support structure 224 may also include fastening components, such as screws, bolts, hooks, or other hardware suitable for fixing the image sensor 230 and emitters 222 to structure, such as the rear inner wall 201d, that is suitable for maintaining the components in the proper orientation. The first and second emitters 222a & 222b are oriented on the emitter and sensor panel 220 to shine light towards the sash panels 208a & 208b. The image sensor 230 is positioned to detect an image of the sash panels 208a & 208b.

The sash panels 208a & 208b each have corresponding reflective markers 240a & 240b. A first reflective marker 240a is attached to a position substantially indicative of an edge of the first sash panel 208a. A second reflective marker 240b is attached to a position substantially indicative of an edge of the second sash panel 208b. The first and second reflective markers 240a & 240b may be positioned substantially along a line parallel to a line on the work surface 204 that is coplanar with the sash panels 208a & 208b. The first and second reflective markers 240a & 240b may be made of any material that reflects the light emitted by the first and second light emitters 222a & 222b. The first and second reflective markers 240a & 240b may be attached to the sash panel edges by an adhesive, or by any other suitable attachment material or device.

The first and second emitters 222a & 222b may be any suitable light emitting device configured to illuminate an area that covers the reflective markers 240a & 240b on the sash panels 208a & 208b. In example implementations described here without limitation, the first and second emitters 222a & 222b are infrared light emitting devices. The image sensor 230 may be any suitable image sensing device configured to detect and track an image of the reflective markers 240a & 240b when the first and second emitters 222a & 222b illuminate the reflective markers 240a & 240b. In example implementations described here without limitation, the image sensor 230 is an infrared detecting image sensor configured to detect the infrared light reflecting from each of the reflective markers 240a & 240b.

Figure 2B:
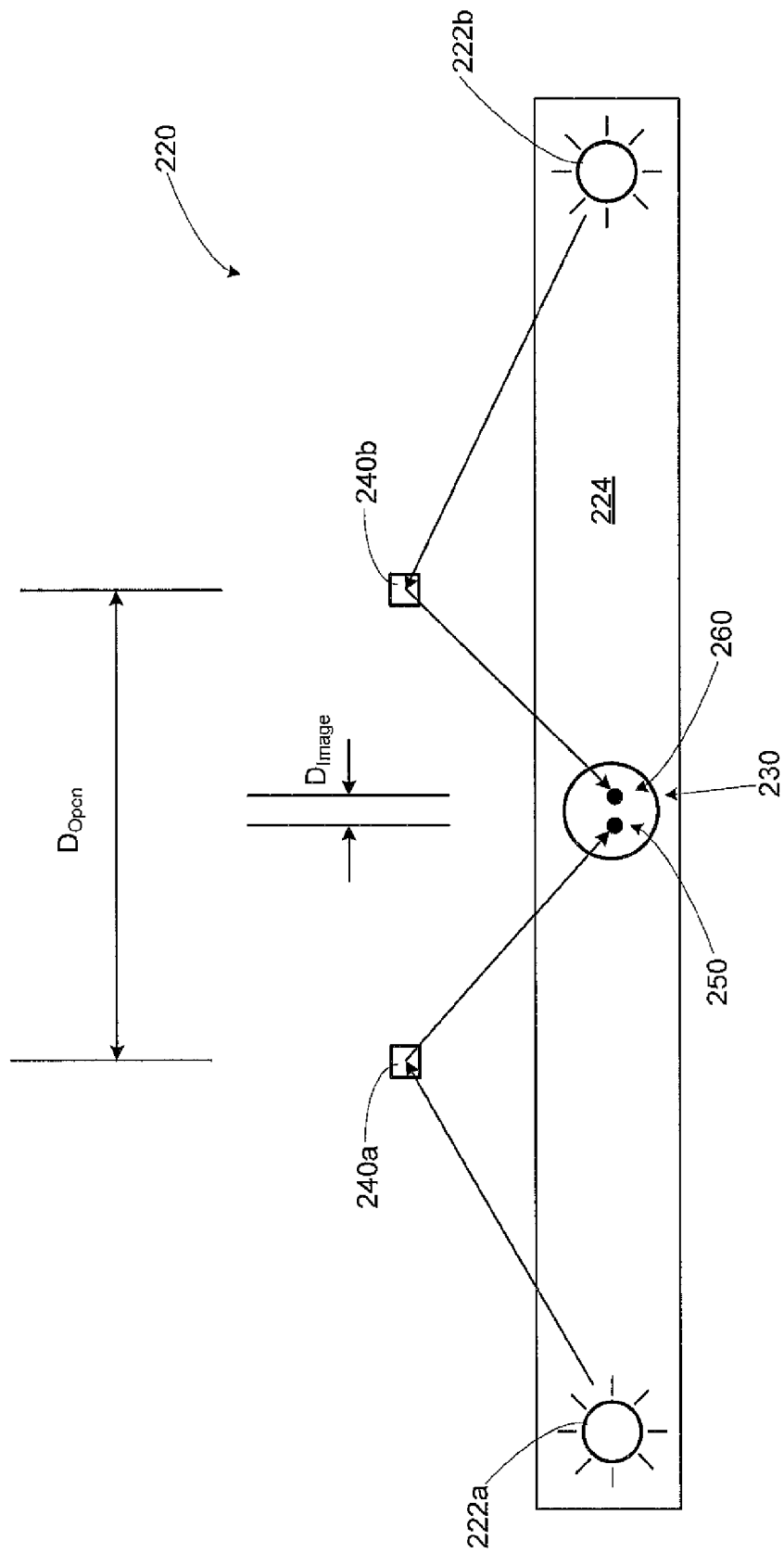
FIG. 2B is a rear view of the emitter and sensor panel in FIG. 2A.

The image sensor 230 is configured to detect the image of each reflective marker 240a & 240b when the sash panels 208a & 208b are moved to a range of positions horizontally in the hood opening 202. The image of each reflective marker 240a & 240b may appear as a marker image on the image sensor 230 where the marker images are separated by a distance that is proportional to the distance between the reflective markers 240a & 240b. FIG. 2B shows a view that zooms in to the emitter and sensor panel 220. As shown in FIG. 2B, the infrared light from the first and second emitters 222a & 222b reflects from the reflective markers 240a & 240b and is detected as a first marker image 250 corresponding to the light reflecting from the first reflective marker 240a. The reflected infrared light is detected as a second marker image 260 corresponding to the light reflecting from the second reflective marker 240b. The first and second marker images 250 & 260 are separated by a distance $D_{image}$ as shown in FIG. 2B. The reflective markers 240a & 240b are separated by a distance $D_{Open}$.

The reflective markers 240a & 240b are positioned at the edge of each sash panel 208a & 208b, or at least a known distance to each edge, as shown in FIG. 2A. Therefore, the distance $D_{Open}$ between the reflective markers 240a & 240b corresponds to the distance of the opening between the sash panels 208a & 208b. As the sash panels 208a & 208b are moved, the distance $D_{Open}$ becomes correspondingly less or greater. The change in the distance $D_{Open}$ is indicated by a corresponding change in the distance $D_{image}$ between the first and second marker images 250 & 260 in the image captured by the image sensor 230. As noted above, the distance is proportional to the distance $D_{Open}$ by a proportionality constant, or scaling value, that can be provided as a given, or set by a calibration step.

The image sensor 230 may be any suitable imaging device that may be configured to detect first and second marker images 250 & 260 corresponding to sources that identify known indicators of a variable dimension of the sash opening 210. In an example implementation, the image sensor 230 is implemented using a CMOS active-pixel image sensor that generates an image output of pixels in two dimensions at a desired resolution. Examples of CMOS active-pixel image sensors that may be used include CMOS image sensors made by Pixart, such as for example, PAS6167 CMOS QCIF+ Digital image Sensor, which as an output of 176×220 pixels, as well as other Pixart image sensors having different resolutions. A digital image may be retrieved from the CMOS active-pixel image sensor and analyzed to detect the first and second marker images 250 & 260, and to determine the number of pixels between the first and second marker images 250 & 260.

Figure 2C:
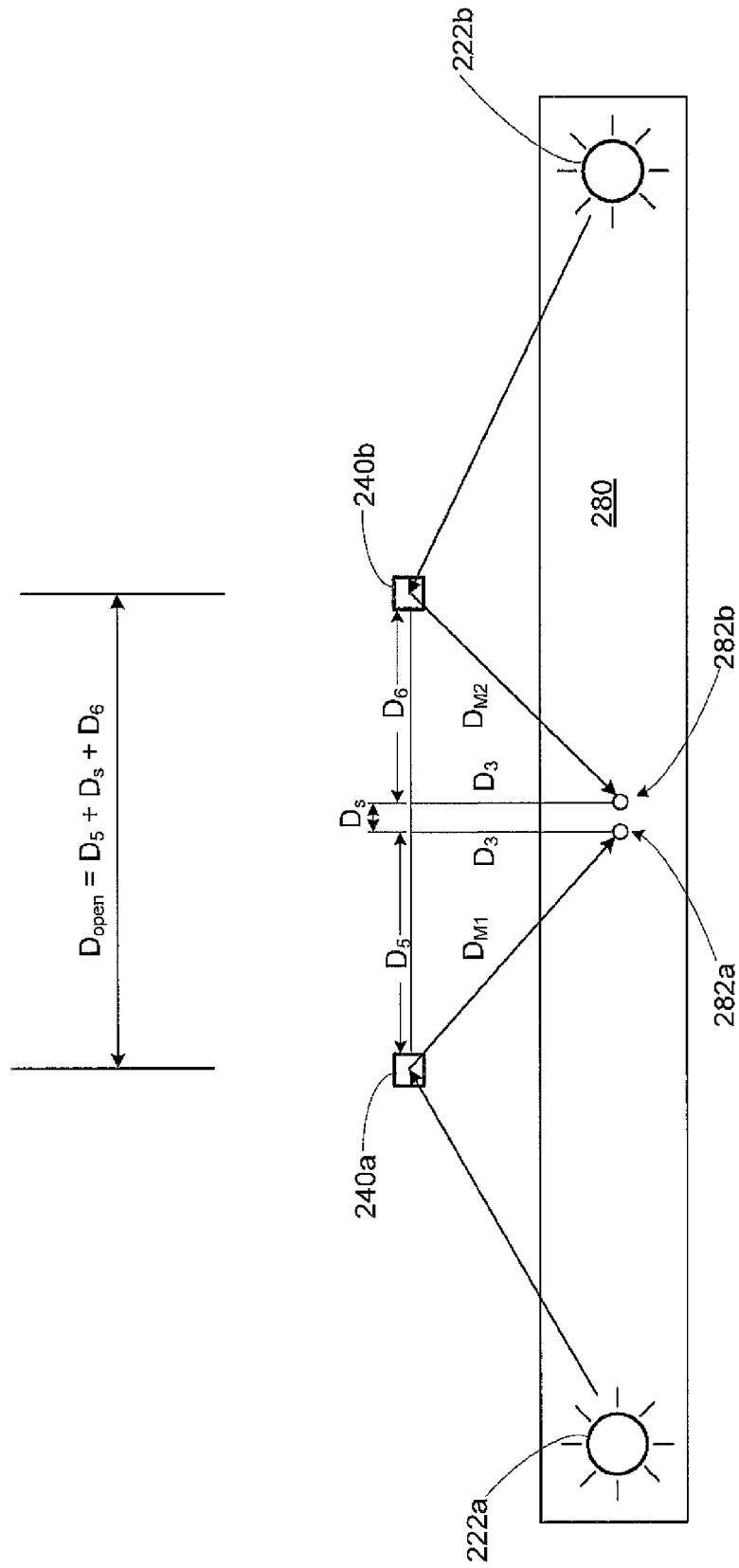
FIG. 2C is a transparent rear perspective view of another example of a fume hood having two horizontally movable sash panels.

The image sensor 230 may also be implemented by a more functionally integrated device such as, for example, an optoelectronic sensor that detects the distance to one of the markers 240. FIG. 2C illustrates an example of an emitter and sensor panel 280 that includes two distance optosensors 282a & 282b in place of the optical image sensor. The first distance optosensor 282a detects a marker image and generates a signal value based on the distance $D_{M1}$ to the first marker 240a. The second distance optosensor 282b detects a marker image and generates a signal value based on the distance $D_{M2}$ to the second marker 240b. The measurement of distances $D_{M1}$ and $D_{M2}$ and the known distance $D_3$ provides two sides of two right triangles with a known length. In a first right triangle shown in FIG. 2C, the distance $D_{M1}$ and the distance $D_3$ are used to determine distance $D_5$. In a second right triangle, the distance $D_{M2}$ and the distance $D_3$ are used to determine distance $D_6$.

Example devices that may be implemented in this manner as the distance optosensors 282a & 282b include distance measuring sensors with analog outputs made by Sharp such as Model Nos. GP2Y0A02YK0F and GP2Y0A710K0F. Suitable optosensors similar to the analog Sharp devices that generate digital outputs may be also be used.

Figure 2D:
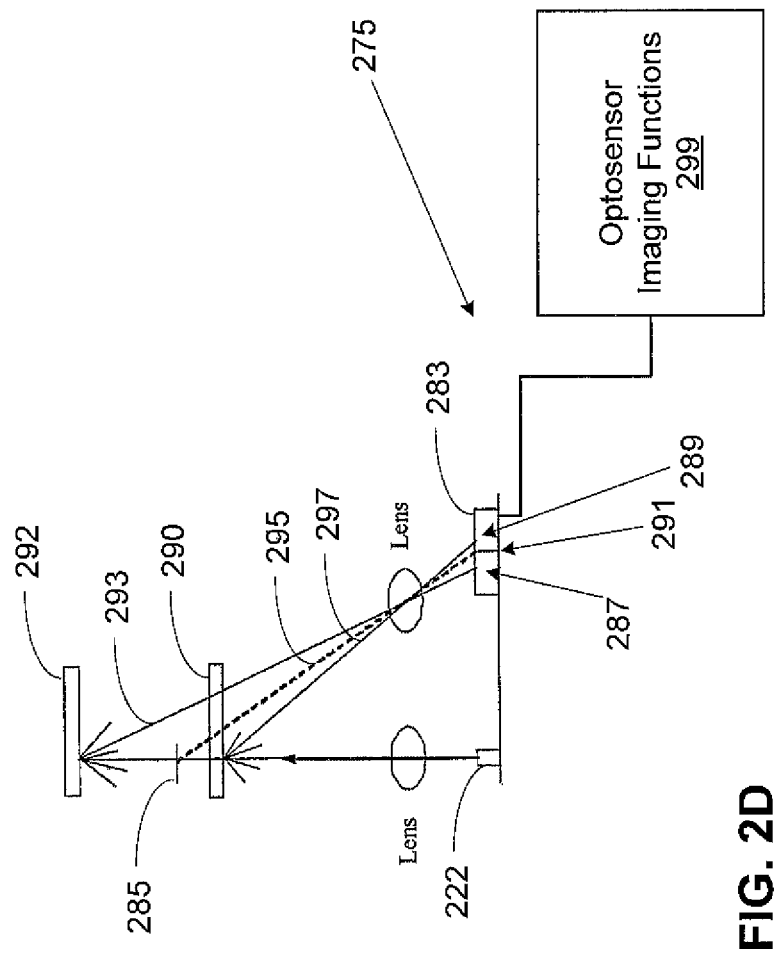
FIG. 2D is a top view of another example implementation of an emitter and sensor bar.

It is noted that each distance optosensor 282a & 282b may also be implemented as modules having hardware and software components that perform functions for determining the distances $D_{M1}$ and $A_{M2}$. Referring to FIG. 2D, an example distance optosensor 275 includes an image sensor 283 and optosensor imaging functions 299. The image sensor 283 captures an image that includes a reflective marker image corresponding to a reflective marker 285. The optosensor imaging functions 299 analyze the image and determine a marker pixel location 291 on the image that corresponds to the reflective marker 285. The optosensor imaging functions 299 may include functions that include software components under program control by a processor (not shown) in the optosensor 275, or a processor used to control other functions in the fume hood.

The optosensor imaging functions 299 may include stored parameters indicating a predetermined open sash pixel location 287 and a predetermined closed sash pixel location 289. A calibration function may be performed to associate the predetermined open sash pixel location 287 with an open sash signal value, and to associate the predetermined closed sash pixel location 289 with a closed sash signal value. The optosensor imaging functions 299 may also store parameters indicating a pixel range and a signal range, where the pixel range comprises the pixels in the image extending linearly from the predetermined closed sash pixel location 287 to the predetermined open sash pixel location 289. The signal range comprises signal values between the closed sash signal value and the open sash signal value. The pixel range is proportional to the signal range in the example illustrated in FIG. 2D. To determine a marker distance between the image sensor 283 and the reflective marker 285 during operation, a signal level corresponding to the marker pixel location 291 may be identified based on the proportionality between the signal range and the pixel range.

The signal range and signal values associated with the pixel locations by the optosensor imaging functions 299 may be any suitable value that may translate to values expressed as lengths. For example, the signal value indicative of the marker distance, the signal range, the closed sash signal value, and the open sash signal value may be, digital values determined under program control by a processor corresponding to distances in units of length. The open sash signal value may be an open sash marker distance 293 measured during a calibration step by determining a pixel location and associating it with a measured distance between the reflective marker and the image sensor when the sash is substantially fully open. The closed sash signal value may be a closed sash marker distance 297 measured during a calibration step by determining a pixel location and associating it with a measured distance between the reflective marker and the image sensor when the sash is substantially fully closed.

In another example implementation, the optosensor imaging functions 299 may include analog devices that generate signal levels, such as voltage, currents, resistances, etc., indicative of signal values. For example, the open sash signal value may be an open sash signal level indicative of an open sash marker distance 293, where the open sash signal level may be measured during a calibration step by determining a voltage, for example, and associating it with a measured distance between the reflective marker and the image sensor when the sash is substantially fully open. The closed sash signal value may be a signal level indicative of a closed sash marker distance 297 measured during a calibration step by determining a second voltage, for example, and associating it with a measured distance between the reflective marker and the image sensor when the sash is substantially fully closed.

In another implementation, the calibration function may associate the predetermined open sash pixel location 287, the predetermined closed sash pixel location 289, and the marker image pixel location 291 directly with corresponding positions within a range of distances between the edges of the sash opening.

It is noted that FIGS. 2A and 2B illustrate one example implementation in a fume hood in which the sash panels 208a & 208b are horizontally movable. Those of ordinary skill in the art will understand that the emitter and sensor panel 220 may also be implemented in fume hoods with vertically movable sash panels. It is also noted that the fume hood 200 in FIG. 2A uses only two sash panels 208a & 208b. Fume hoods with more than two sash panels may implement multiple emitter and sensor panels to detect and track sash panel edges that form sash openings to the fume hood. The multiple emitter and sensor panels may be oriented as needed to track both horizontally movable and vertically movable sash panels.

Figure 3:
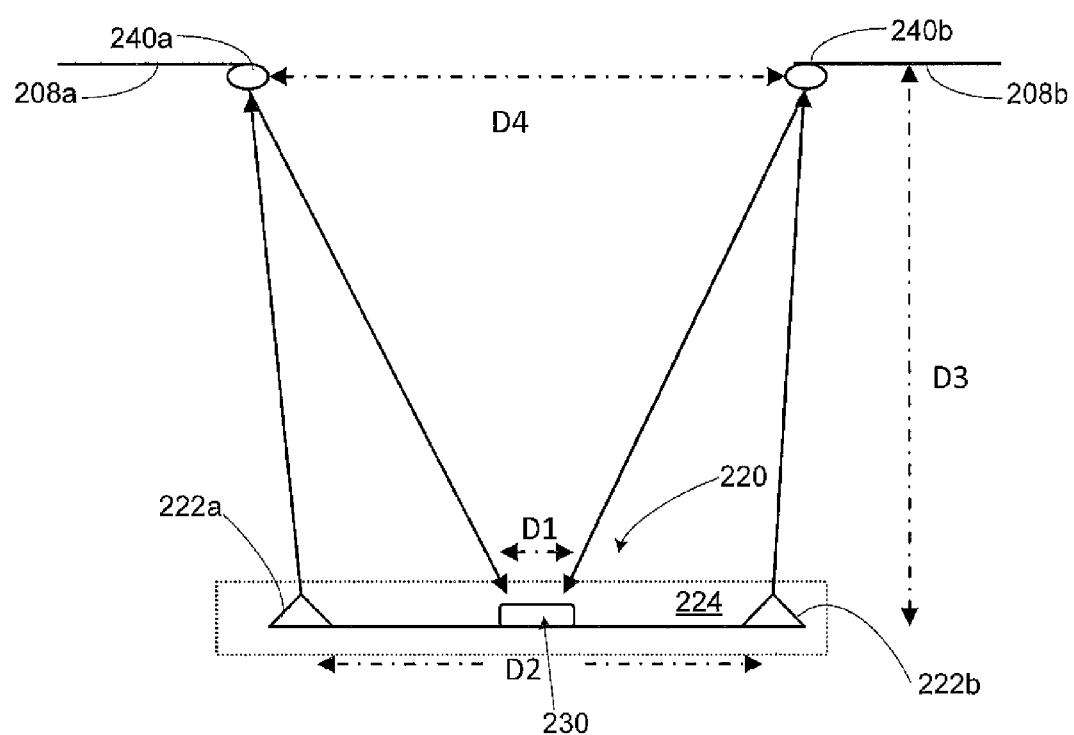
FIG. 3 is a top view of the emitter and sensor bar in FIGS. 2A and 2B.

FIG. 3 is a top view of the emitter and sensor panel in FIGS. 2A and 2B illustrating the known distances and geometry that enables determination of the distance between two sash panels 208a & 208b forming a sash opening. As shown in FIG. 3, the emitter and sensor bar 220 is positioned a distance D3 from the reflective markers 240a & 240b on or near the sash panel edges. The light emitters 222a & 222b on the emitter and sensor panel 220 are separated by a distance indicated by D2 in FIG. 3. The light from the first emitter 222a that reflects off reflective marker 240a leaves the first marker image 250 on the image sensor 230 a distance D1 from the second marker image 260 left by the light from the second emitter 222b that reflects off reflective marker 240b.

FIG. 3 illustrates how the distance D1 between marker images on the image sensor 230 tracks the distance D4 between the reflective markers 240a & 240b. In general, the emitter and sensor panel 220 may be mounted on the rear inner wall 201d of the fume hood enclosure as shown in FIG. 2A. However, it is not necessary that the emitter and sensor panel 220 be mounted on the rear inner wall 201d; any suitable position a known distance D3 opposite the reflective markers 240a & 240b in the fume hood enclosure may be used. The distance D3 between the emitter and sensor panel 220 may be entered as a known parameter into the system memory during configuration or calibration of the system. A scaling value may be determined that relates the pixels in the range of pixels for the distance D1 to the range of units of length for the distance D4.

Figure 4:
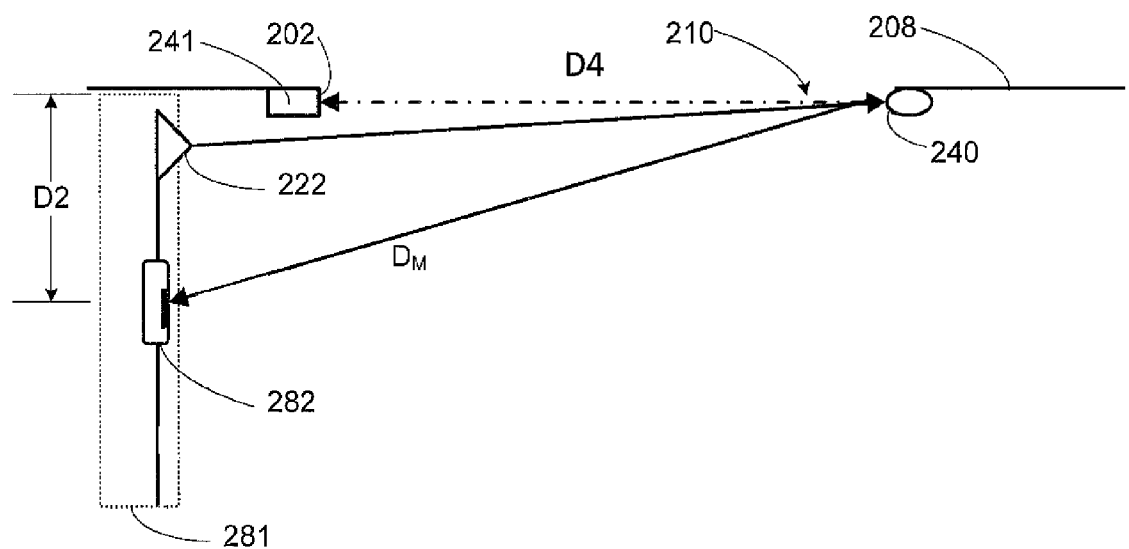
FIG. 4 is a top view of the fume hood of FIG. 2A illustrating another example implementation of systems and methods for determining a sash-opening area.

FIG. 4 is a top view of the fume hood of FIG. 2A illustrating an example of an alternative location for the mounting of an emitter and sensor panel 281 configured as described above with reference to FIG. 2C except that a single emitter 222 is mounted to one side of a single distance optosensor 282. The emitter and sensor panel 281 shown in FIG. 4 is mounted to one side of the hood opening 202 in relatively close proximity to an edge 241 of the hood opening 202. The emitter sensor panel 281 extends in a direction perpendicular to the sash opening 210 where the sash opening 210 is formed between the edge of the hood opening 202 and the edge of the sash panel 208. In alternative implementations, the emitter and sensor panel 280 may be oriented parallel to the sash opening 210.

The sash panel 208 is provided with a reflective marker 240 on one edge of the sash panel 208. The emitter and sensor panel 281, oriented in the fume hood as shown in FIG. 4, tracks the motion of the sash panel 208 using the distance optosensor 282 described above with reference to FIG. 2C. In the example illustrated in FIG. 4, D2 is the distance between the light emitter 222 and the distance optosensor 282. The light emitted by the light emitter 222 is reflected off the reflective marker 240 and forms a single marker image on the distance optosensor 282. Distance D4 may be determined by measuring a signal value output of the distance optosensor 282. The signal value output indicates a number of pixels traversed by the marker image on the distance optosensor 282 as the sash panel 208 is moved. The single marker image on the distance optosensor 282 moves as the distance between the distance optosensor 282 and the reflective marker 240 changes. The distance optosensor 282 may be calibrated by measuring the signal output, which may be a voltage level, a current level, a digital value, or any other suitable signal value, when the sash panel 208 is at a closed position to determine a closed sash signal value. The signal value may also be measured with the sash panel 208 at its most open position to determine a max open sash signal value. The signal value output for the position of the sash panel 208 between maximum open and fully closed may be tracked linearly for signal values between the closed sash signal value and the max open sash signal value. This signal value indicates the distance $D_M$, which is the distance between the distance optosensor 282 and the reflective marker 240.

In the example illustrated in FIG. 4, only one right triangle is formed. Once the distance $D_M$ is determined using the distance optosensor 282, the distance D4 may also be determined. It is noted that the emitter and sensor panel 281 is not even with the edge 241 of the hood opening 202. However, any distance between the edge 241 and the emitter and sensor panel 280 may be predetermined and stored as a parameter and subtracted from the distance of the calculated side of the right triangle to arrive at D4.

Once the distance D4 has been determined, the area A of the sash opening 210 may be calculated. Referring to FIG. 2A, the distance D4 defines the variable width dimension, $x_{sash}$, of the sash opening 210. The width dimension, $x_{sash}$, is multiplied by the height dimension, $y_{sash}$, to determine the area, $A(x_{sash}, y_{sash})$, of the sash opening 210. The distance D4 in the example illustrated in FIG. 3 is the width dimension $x_{sash}$ in the example fume hood illustrated in FIGS. 2A-2B in which the sash panels 208a & 208b are horizontally movable and the height dimension $y_{sash}$ is fixed. The distance D4 would represent the height dimension $y_{sash}$ for a fume hood having sash panels that are vertically movable, and the width dimension $x_{sash}$ would be fixed. Fume hoods that implement sash panels that are horizontally movable and sash panels that are vertically movable may include multiple emitter and sensor panels to track the multiple sash panels moving in the different directions to determine the width dimension $x_{sash}$ and the height dimension $y_{sash}$, which are both variable.

III. System for Controlling Ventilation in a Fume Hood

As noted above, a controller may be provided, either integrated with the emitter and sensor panel 220 (FIG. 2A), or connected to receive digital representations of the images captured by the image sensor 230 and use the images to determine the variable distance between, the sash panel edges and the area of the sash opening or openings. In addition, the fume hood may include, or be connected to, an exhaust fan and damper arrangement (not shown). The controller may be incorporated in a system for controlling the ventilation in the fume hood. Alternatively, the controller may be configured to communicate with a room ventilation control system that may be configured to control the ventilation in the fume hood. Regardless of how the different functions and components are distributed or packaged, the systems and methods for determining the area of a sash opening may be configured to operate in a system for controlling ventilation in a fume hood.

Figure 5:
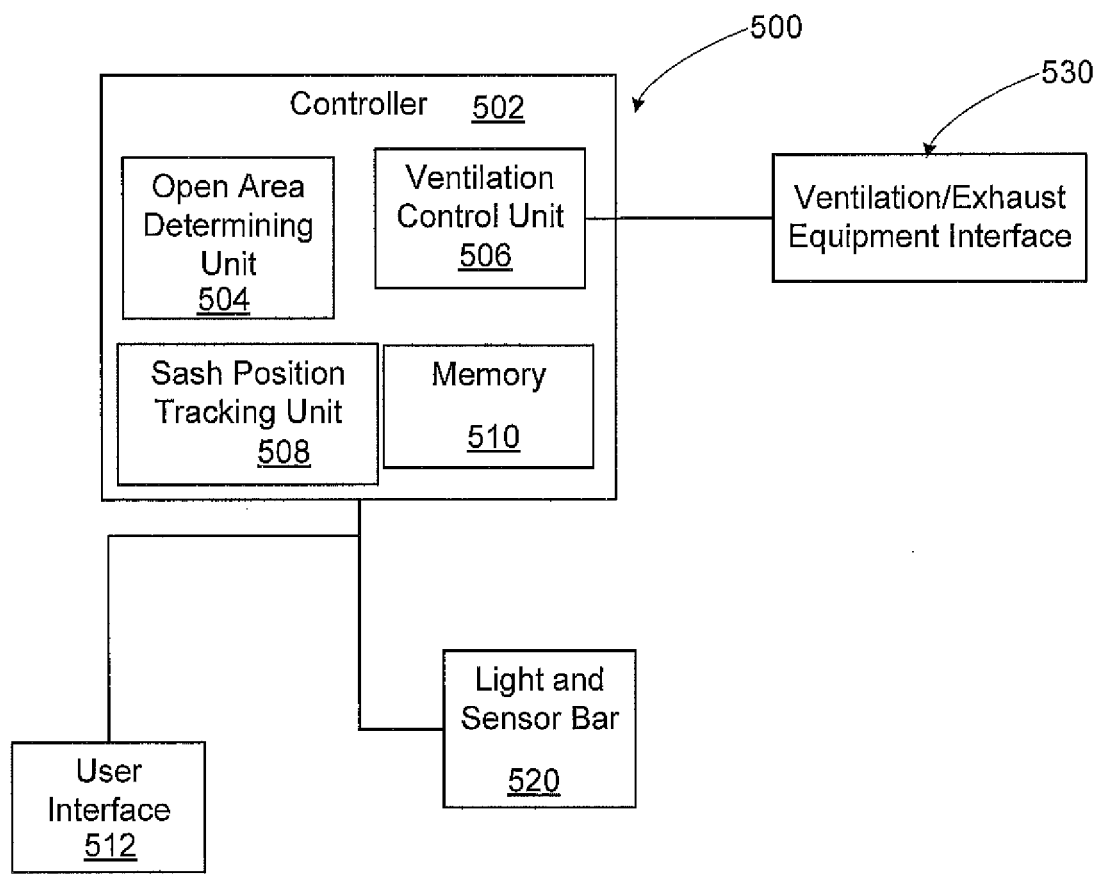
FIG. 5 is a block diagram of a system for controlling ventilation, in a fume hood.

FIG. 5 is a block diagram of a system 500 for controlling ventilation in a fume hood. The system 500 in FIG. 5 includes a controller 502 configured to perform functions that include (without limitation):

an open area determining unit 504,
a ventilation control unit 506, and
a sash position tracking unit 508.

The controller 502 may also include memory 510 and connections to user interface devices 512. The controller 502 may also have a connection to a emitter and sensor panel 520, which includes a light emitting device (such as an infrared source as described above with reference to FIGS. 2A, 2B, 3, and 4) and an image sensor. The ventilation control unit 506 may include an interface to ventilation/exhaust equipment 530.

The controller 502 may perform the function of tracking the sash position using the sash position tracking unit 508 by receiving images captured by the image sensor on the emitter and sensor panel 520, which may be configured to capture images as described above with reference to FIGS. 2A, 2B, 3, and 4. An example of the sash position tracking unit 508 may be configured to determine the distance D4 between edges of the sash opening (such a sash opening 210 in FIG. 3) that define the opening of the fume hood at a given time. The edge detection may be performed using reflective markers 240a & 240b and the image sensor 230 as described above with reference to FIGS. 2A, 2B, 3, and 4.

It is noted that the sash position tracking unit 508 may receive an image from the image sensor 230 (in FIG. 2A) and analyze the image to determine the distance in pixels between the marker images 250 and 260 as described above. Alternatively; the emitter and sensor panel 220 may be implemented as a more integrated device that performs some degree of measurement before communicating results. For example, a distance measurement sensor may be implemented that determines the distance D1 (in FIG. 2B) and outputs a voltage value or digital value indicative of the distance D1.

The distance D4 indicating the variable dimension of the area $A(x_{sash}, y_{sash})$ is communicated to the open area determining unit 504. The open area determining unit 504 determines an area of the sash opening based on the distance D4 determined by the sash position tracking unit 508. As discussed above, a pixels/unit length may be determined in calibration or input as a pre-determined value. Other known characteristics may be provided to permit the area determining unit 504 to determine the area of the sash opening based on the known parameters, geometry of the sash opening, and orientation of the sash panel(s) and the image sensor.

The ventilation control unit 506 uses the area of the sash opening to control the ventilation in the fume hood so that the face velocity is maintained within a desired range. The ventilation control unit 506 may communicate with ventilation/exhaust equipment through a ventilation/exhaust equipment interface 530 to adjust fans and dampers as determined by the ventilation control unit 506. The ventilation/exhaust equipment interface 530 may also include connections to strategically placed pressure sensors to measure a pressure gradient between the inside of the fume hood and the outside of the fume hood. The actual algorithms for determining the proper settings of the fans and/or dampers for a desired range of face velocity are well known to those of ordinary skill in the art and, therefore, need not be discussed in any further detail.

IV. Methods for Measuring Sash Opening Area

FIG. 6A is a flowchart illustrating operation of a calibration function 600 for calibrating a system for measuring the area of a sash opening using images captured by an image sensor on an emitter and sensor panel. The calibration function 600 may be performed before tracking the position of the sash panel to determine any parameters that may be used to calculate the area of the sash opening. In an example implementation, a scaling value is determined during calibration to calculate a distance in length units for the variable dimension of the sash opening. At step 602 the calibration function is invoked. The calibration function may be invoked upon request via an input signal, command, or other suitable trigger. The trigger may operate under program control, or by a suitable hardware switch.

At step 604, the sash panel (or panels) is positioned at an open calibration position. The calibration position may be any suitable, predetermined position that provides a reference length between $x=0$ (and/or $y=0$) and $y=y_{Max}$ (and or $x=x_{Max}$). In one example, the reference length may be set for a fully open sash opening such that the area of the sash opening is at its maximum variable length. In another implementation, the open calibration position may be any position at which the sash panels are currently set. Known distances, such as distances D2 and D3 shown in FIGS. 3 and 4 may be used to determine a reference length for distance D4.

At step 606, an image is captured at the open calibration position. At step 608, the image is analyzed to identify the marker images in the image. At step 610, a distance D1 between the marker images is determined by determining the number of pixels between the marker images. The distance measure is defined as distance $D1_{open}$ in pixels.

At step 612, the sash panels are positioned at a closed calibration position. At step 614, an image is captured at the closed calibration position. At step 616, the image is analyzed to identify the marker images in the image. At step 618, a distance D1 between the marker images is determined by determining the number of pixels between the marker images. The distance measure is defined as distance $D1_{closed}$ in pixels. It is noted that the distance $D1_{closed}$ may be predetermined making steps 612, 614, 616, and 618 optional.

At step 620, a scaling value is calculated as:

$$\text{scaling value} = (D1_{open} - D1_{closed})/\text{MAX}(D4_{open}), (\text{in pixels/unit length}).$$

FIG. 6B is a flowchart illustrating operation of a tracking function for measuring the area of a sash opening using images captured by an emitter and sensor panel. The flowchart in FIG. 6B illustrates operation of a tracking function 650 that employs an example of an emitter and sensor panel 220 (FIG. 2A) that illuminates the sash panel opening 210 (FIG. 2A) and detects edges defining the sash panel opening in the image sensor 230.

At step 654, an image is captured by the image sensor 230 (FIG. 2A). At step 656, the image is analyzed to detect marker images indicative of the position of edges of the sash opening. At step 658, a pixel distance D1 is calculated between the marker images on the captured image. At step 660, the distance D4 is calculated using:

$$D4 = \text{scaling value}/D1, \text{ in unit length.}$$

At step 662, the sash opening area is determined based on D4, which is the measured length of the variable dimension of the sash opening 210, where A=D4*Length of fixed dimension.

It is noted that the calibration and tracking function described with reference to FIGS. 6A and 6B implement an image sensor in which an image is analyzed for marker images. In another implementation, the image sensor may be implemented using a distance measuring sensor that determines a value indicative of the distance between the marker images and generates a corresponding signal. Using a distance measuring sensor, the calibration function involves determining values of the signal that correspond to the open and closed calibration positions. The value D1 is not a number of pixels, but a signal value, such as a voltage level for example if the distance measuring sensor is an analog device. The scaling value would then become a value in units of volts (or millivolts) per unit length.

It is also noted that a triangulation method may be implemented to determine the length D4 and a calibration function may not be needed at all given enough information about the structure of the fume hood.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A system for determining the area of a sash opening in a fume hood formed by at least one movable sash panel mounted over a hood opening to an enclosure structure of the fume hood to reduce the area of the sash opening when the at least one sash panel is moved in one direction or to expand the area of the sash opening when moved in the other direction to provide access to a work surface in the fume hood enclosure space, the system comprising:

a emitter and sensor panel mounted in a fume hood enclosure space, the emitter and sensor panel comprising a first light emitter mounted on one side of an image sensor, and a second light emitter mounted on an opposite side of the image sensor, the first and second light emitters configured to illuminate the fume hood enclosure space;

a first reflective marker mounted on one edge of the sash opening to reflect light from at least the first light emitter;

a second reflective marker mounted on an opposite edge of the sash opening to reflect light from at least the second light emitter, where at least one of the edges of the sash opening with either the first or second reflective marker is formed by an edge of one of the movable sash panels; and a sash position tracking unit configured to determine a distance between the first and second reflective markers based on a distance between a first marker image of the first reflective marker and a second marker image of the second reflective marker in an image detected by the image sensor, where the distance between the first and second reflective markers is used to determine the area of the sash opening and where the image sensor is configured to capture a two-dimensional image divided in pixels, and where the distance between the first and second reflective markers is determined by determining the number of pixels between the first and second marker images, and dividing the number of pixels by a scaling value indicating a number of pixels per unit length.

2. The system of claim 1 further comprising an area determining unit configured to determine the area of the sash opening by multiplying the distance between the first and second reflective markers by a distance between opposite edges of the sash opening unit that are not the edges having the first and second reflective markers.

3. The system of claim 1 where the image sensor determines the distance between the first and second marker images and generates a signal indicative of the distance between the first and second marker images, where the distance between the first and second reflective markers is determined by dividing the signal indicative of the distance between the first and second marker images by a scaling value indicating a signal value per unit length.

4. The system of claim 1 where the image sensor detects infrared and the first and second light emitters are infrared emitters.

5. The system of claim 1 where:
the emitter and sensor panel is mounted in parallel with the first and second reflective markers such that the emitter and sensor panel is oriented horizontally for horizontally movable sash panels and vertically for vertically movable sash panels.

6. The system of claim 2 further comprising:
an interface with a ventilation control function, where the area determining unit communicates the determined area of the sash opening to the ventilation control unit, and where the ventilation control unit controls ventilation in the fume hood to maintain a face velocity at the fume hood opening within a desired range.

7. A method for determining an area of a sash opening in a fume hood formed by at least one movable sash panel mounted over a hood opening to an enclosure structure of the fume hood to reduce the area of the sash opening when the at least one sash panel is moved in one direction or to expand the area of the sash opening when moved in the other direction to provide access to a work surface in the fume hood enclosure space, the method comprising:

providing a emitter and sensor panel in the fume hood enclosure structure, the emitter and sensor panel comprising a first light emitter mounted on one side of an image sensor, and a second light emitter mounted on an opposite side of the image sensor;

illuminating the fume hood enclosure space using the first and second light emitters;

detecting a first marker image of light reflecting off a first reflective marker attached to a first edge of the sash opening;

detecting a second marker image of light reflecting off a second reflective marker attached to a second edge of the sash opening opposite the first along a variable dimension of the sash opening area;

determining a distance between the first and second reflective markers based on a distance between the first and second marker images; and using the distance between the first and second reflective markers to determine the sash opening area
and where the step of determining the distance between the reflective markers comprises:
determining a distance in pixels between the first and second marker images; and
dividing the number of pixels by a scaling value indicating a number of pixels per unit length.

8. The method of claim 7 further comprising:
determining the area of the sash opening by multiplying the distance between the reflective markers and a distance between opposite edges of the sash opening that are not the edges having the first and second reflective markers.

9. The method of claim 7 further comprising:
performing a calibration function to determine a scaling value indicative of a measured value relating to the first and second marker images and a corresponding unit length.

10. The method of claim 9 where the step of performing the calibration function comprises:
determining the scaling value where the measured value is indicative of a number of pixels per unit length.

11. The method of claim 7 further comprising:
communicating the area of the sash opening to a ventilation control unit to determine a face velocity for the sash opening.

12. A system for determining the area of a sash opening in a fume hood formed by a movable sash panel mounted over a hood opening to an enclosure structure of the fume hood to reduce the area of the sash opening when the sash panel is moved in one direction or to expand the area of the sash opening when moved in the other direction to provide access to a work surface in the fume hood enclosure space, the system comprising:
a emitter and sensor panel mounted in a fume hood enclosure space, the emitter and sensor panel comprising a light emitter mounted on one side of an optosensor at an emitter-optosensor distance between the light emitter and the optosensor, the light emitter configured to illuminate the fume hood enclosure space;
a reflective marker mounted on one edge of the sash panel that is also an edge of the sash opening to reflect light from the light emitter, the optosensor configured to generate a signal value indicative of a marker distance between the optosensor and the reflective marker; and
a sash position tracking unit configured to determine a distance between the reflective marker and an opposite edge of the sash opening opposite the reflective marker, where the distance between the reflective marker and the opposite edge is determined using the marker distance and the emitter-optosensor distance between the light emitter and optosensor, where the distance between the reflective marker and the opposite edge of the sash opening is used to determine the area of the sash opening.

13. The system of claim 12 where the distance between the reflective marker and the opposite edge plus a known distance between the opposite edge and a line extending from the emitter and sensor panel is determined as a first side of a right triangle having the emitter-optosensor distance as a second side, and the marker to optosensor distance as a hypotenuse.

14. The system of claim 12 where the reflective marker is a first reflective marker, the light emitter is a first light emitter, the optosensor is a first optosensor, where the system further comprises:
a second reflective marker mounted on the opposite edge of the sash opening; and where the emitter and sensor panel further comprises:
a second optosensor mounted on a side of the first optosensor opposite the first light emitter at an optosensor distance from the first optosensor; and
a second light emitter mounted on a side of the second optosensor opposite the first optosensor at a second emitter-optosensor distance between the second optosensor and the second light emitter, the second optosensor configured to generate another signal value indicative of another marker distance between the second optosensor and the second reflective marker;
where the sash position tracking unit is configured to determine the distance between the first reflective marker and the opposite edge using the other marker distance between the second optosensor and the second reflective marker and the second emitter-optosensor distance.

15. The system of claim 14 where the distance between the first reflective marker and the second reflective marker on the opposite edge is determined by:
determining a first part of the distance as a first side of a first right triangle having the emitter-optosensor distance as a second side and the marker to optosensor distance as the first right triangle hypotenuse;
determining a second part of the distance as a first side of a second right triangle having the other emitter-optosensor distance as a second side and the other marker to optosensor distance as the second right triangle hypotenuse; and
adding the first part of the distance and the second part of the distance to determine the distance.

16. The system of claim 14 where the movable sash panel is a first sash panel, the system further comprising:
a second movable sash panel configured to move in the same direction as the first sash panel, where the opposite edge opposite the first reflective marker is an edge of the second sash panel, and where the second reflective marker is mounted on the edge of the second sash panel.

17. The system of claim 12 where the emitter and sensor panel is mounted perpendicular to the sash opening area where the first and second reflective markers are both on the same side of the emitter and sensor panel.

18. The system of claim 12 where:
the emitter and sensor panel is mounted in parallel with the first and second reflective markers such that the emitter and sensor panel is oriented horizontally for horizontally movable sash panels and vertically for vertically movable sash panels.

19. The system of claim 12 where:
the optosensor comprises an image sensor configured to capture an image that includes a reflective marker image of the reflective marker, where the reflective marker image is located at a marker pixel location on the image, the optosensor being further configured to generate the signal value indicative of the marker distance by:
comparing the marker pixel location with a pre-determined closed sash pixel location and a pre-determined open sash pixel location, where a closed sash signal value corresponds to the pre-determined closed sash pixel location and an open sash signal value corresponds to the pre-determined open sash pixel location, and where a signal range between the closed sash signal value and the open sash signal value is proportional to a pixel range linearly extending between the pre-determined closed pixel location and the pre-determined open pixel location; and identifying the signal value indicative of the marker distance corresponding to the marker pixel location based on the proportionality between the signal range and the pixel range.

20. The system of claim 19 where:
the signal value indicative of the marker distance, the signal range, the closed sash signal value, and the open sash signal value are digital values determined under program control by a processor corresponding to distances in units of length.

21. The system of claim 19 where:
the signal value indicative of the marker distance, the signal range, the closed sash signal value, and the open sash signal value are analog signal levels corresponding to a range of signal levels generated by a device according to the distance between the image sensor and the reflective marker.

* * * * *